(12) United States Patent
Lin et al.

(10) Patent No.: US 10,630,185 B2
(45) Date of Patent: Apr. 21, 2020

(54) POWER DELIVERY DEVICE AND CONTROL METHOD THEREOF

(71) Applicant: DELTA ELECTRONICS, INC., Taoyuan (TW)

(72) Inventors: Kun-Chi Lin, Taoyuan (TW); Chung-Chieh Cheng, Taoyuan (TW); Kun-Jang Kuo, Taoyuan (TW); Tien-He Chen, Taoyuan (TW); Shou-Chieh Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/019,566

(22) Filed: Jun. 27, 2018

(65) Prior Publication Data

US 2018/0323715 A1    Nov. 8, 2018

Related U.S. Application Data

(63) Continuation of application No. 15/373,485, filed on Dec. 9, 2016, now Pat. No. 10,044,275.

(30) Foreign Application Priority Data

Jun. 21, 2016   (TW) .............................. 105119385 A

(51) Int. Cl.
*H02M 3/335* (2006.01)
*H02M 1/42* (2007.01)
*H02M 1/00* (2006.01)

(52) U.S. Cl.
CPC ......... *H02M 3/33507* (2013.01); *H02M 1/42* (2013.01); *H02M 1/4208* (2013.01);
(Continued)

(58) Field of Classification Search
CPC ............... H02M 3/33507; H02M 1/42; H02M 2001/0009; H02M 3/33523;
(Continued)

(56) References Cited

U.S. PATENT DOCUMENTS 5,903,138 A * 5/1999 Hwang ............... H02M 1/4225
323/224
5,960,207 A * 9/1999 Brown ...................... G06F 1/26
363/98

(Continued)

FOREIGN PATENT DOCUMENTS

CN       1421986 A       6/2003
CN       1890865 A       1/2007
(Continued)

*Primary Examiner* — Kyle J Moody
(74) *Attorney, Agent, or Firm* — CKC & Partners Co., LLC

(57) ABSTRACT

A power delivery device and a control method are shown. The power delivery device includes a power factor correction circuit, and an output voltage control circuit. The power factor correction circuit is configured to increase a power factor of the power delivery device. The output voltage control circuit is configured to control an output voltage of the power delivery device, and detect an output current of the power delivery device. The power factor correction circuit is uncontrolled by the output voltage control circuit in response to a first load state of the power delivery device, and is controlled by the output voltage control circuit in response to a second load state of the power delivery device.

16 Claims, 7 Drawing Sheets

(52) U.S. Cl.
CPC .......... *H02M 3/33523* (2013.01); *H02M 2001/0009* (2013.01); *H02M 2001/0032* (2013.01); *H02M 2001/0048* (2013.01); *Y02B 70/126* (2013.01); *Y02B 70/1491* (2013.01); *Y02B 70/16* (2013.01)

(58) Field of Classification Search
CPC ....... H02M 1/4208; H02M 2001/0048; H02M 2001/0032; Y02B 70/16; Y02B 70/1491; Y02B 70/126
See application file for complete search history.

(56) References Cited

U.S. PATENT DOCUMENTS

| | | | |
|---|---|---|---|
| 6,903,536 B2 | 6/2005 | Yang | |
| 6,967,851 B2 | 11/2005 | Yang et al. | |
| 7,023,710 B2 * | 4/2006 | Durbaum | H02M 1/12 363/19 |
| 7,173,833 B2 | 2/2007 | Lin et al. | |
| 7,453,248 B2 | 11/2008 | Takeuchi | |
| 7,489,532 B2 | 2/2009 | Shih | |
| 7,903,439 B2 | 3/2011 | Oettinger et al. | |
| 8,278,900 B2 * | 10/2012 | Strijker | H02M 1/4225 323/284 |
| 8,779,676 B2 | 7/2014 | Simi et al. | |
| 8,867,239 B2 | 10/2014 | Joo et al. | |
| 8,941,365 B2 | 1/2015 | Murdock et al. | |
| 8,963,451 B2 | 2/2015 | Altheimer et al. | |
| 9,166,470 B2 * | 10/2015 | Kelly | H02M 1/4225 |
| 9,178,413 B2 | 11/2015 | Huynh et al. | |
| 9,178,431 B2 | 11/2015 | Chen | |
| 9,438,119 B1 * | 9/2016 | Hwang | H02M 3/335 |
| 9,595,867 B2 | 3/2017 | Leisten et al. | |
| 9,601,989 B2 | 3/2017 | Wu et al. | |
| 2012/0250361 A1 * | 10/2012 | Hu | H02M 3/33569 363/21.02 |
| 2014/0016364 A1 | 1/2014 | Chen | |
| 2015/0180329 A1 * | 6/2015 | Yoshino | H02M 3/33546 363/21.04 |
| 2016/0043634 A1 | 2/2016 | Bemat et al. | |
| 2016/0105095 A1 * | 4/2016 | Mayell | H02M 1/4225 323/205 |
| 2016/0322906 A1 | 11/2016 | Hwang | |
| 2016/0344283 A1 * | 11/2016 | Lin | H02M 1/36 |
| 2016/0365817 A1 | 12/2016 | Schuster et al. | |
| 2017/0093274 A1 | 3/2017 | He et al. | |
| 2017/0231045 A1 | 8/2017 | Hu et al. | |

FOREIGN PATENT DOCUMENTS

| | | |
|---|---|---|
| CN | 101330783 A | 12/2008 |
| EP | 1317052 A2 | 6/2003 |
| JP | H08111975 A | 4/1996 |
| TW | I389437 B1 | 3/2013 |
| TW | I410775 B | 10/2013 |

\* cited by examiner

POWER DELIVERY DEVICE AND CONTROL METHOD THEREOF

RELATED APPLICATIONS

This application is a continuation of U.S. application Ser. No. 15/373,485, filed Dec. 9, 2016, which claims priority to Taiwan Application Serial No. 105119385, filed Jun. 21, 2016, all of which are herein incorporated by reference.

BACKGROUND

Technical Field

The present disclosure relates to a power delivery device, and in particular, to the power delivery device with various output voltages.

Description of Related Art

In recent times, with the popularity of mobile electronic devices such as smartphones, tablets, etc., how to satisfy the charging requirement of the mobile electronic devices has become an important research topic in the field. In various charging devices, the USB power delivery has been more and more important these days.

To avoid negative effects on the power system, with the increasing power, the charging devices nowadays require power factor correction abilities to comply with the regulations. However, when the charging devices output low power, the power factor correction circuit results in unnecessary energy consumption, and thus reduce the efficiency of the charging device. Therefore, how to improve the efficiency of the charging device and achieve the goal of energy saving when the power factor regulations are satisfied is an important research topic in the field.

SUMMARY

One aspect of the present disclosure is a power delivery device. The power delivery device includes a power factor correction circuit, and an output voltage control circuit. The power factor correction circuit is configured to increase a power factor of the power delivery device. The output voltage control circuit is configured to control an output voltage of the power delivery device, and detect an output current of the power delivery device. The power factor correction circuit is uncontrolled by the output voltage control circuit in response to a first load state of the power delivery device, and is controlled by the output voltage control circuit in response to a second load state of the power delivery device.

Another aspect of the present disclosure is a power delivery device. The power delivery device includes an output voltage control circuit and a power factor correction circuit. The output voltage control circuit is configured to control an output voltage of the power delivery device, to selectively switch the output voltage at one of a plurality of voltage levels, and configured to detect an output current of the power delivery device. The power factor correction circuit is configured to increase a power factor of the power delivery device. The power factor correction circuit is uncontrolled by the output voltage control circuit in response to a first load state of the power delivery device, and is controlled by the output voltage control circuit in response to a second load state of the power delivery device.

Yet another aspect of the present disclosure is a control method. The control method includes: controlling, by an output voltage control circuit, an output voltage of a power delivery device selectively at one of a plurality of voltage levels; detecting, by the output voltage control circuit, an output current of the power delivery device; increasing, by a power factor correction circuit, a power factor of the power delivery device; remaining the power factor correction circuit being uncontrolled by the output voltage control circuit in response to a first load state of the power delivery device; and controlling the power factor correction circuit by the output voltage control circuit in response to a second load state of the power delivery device.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
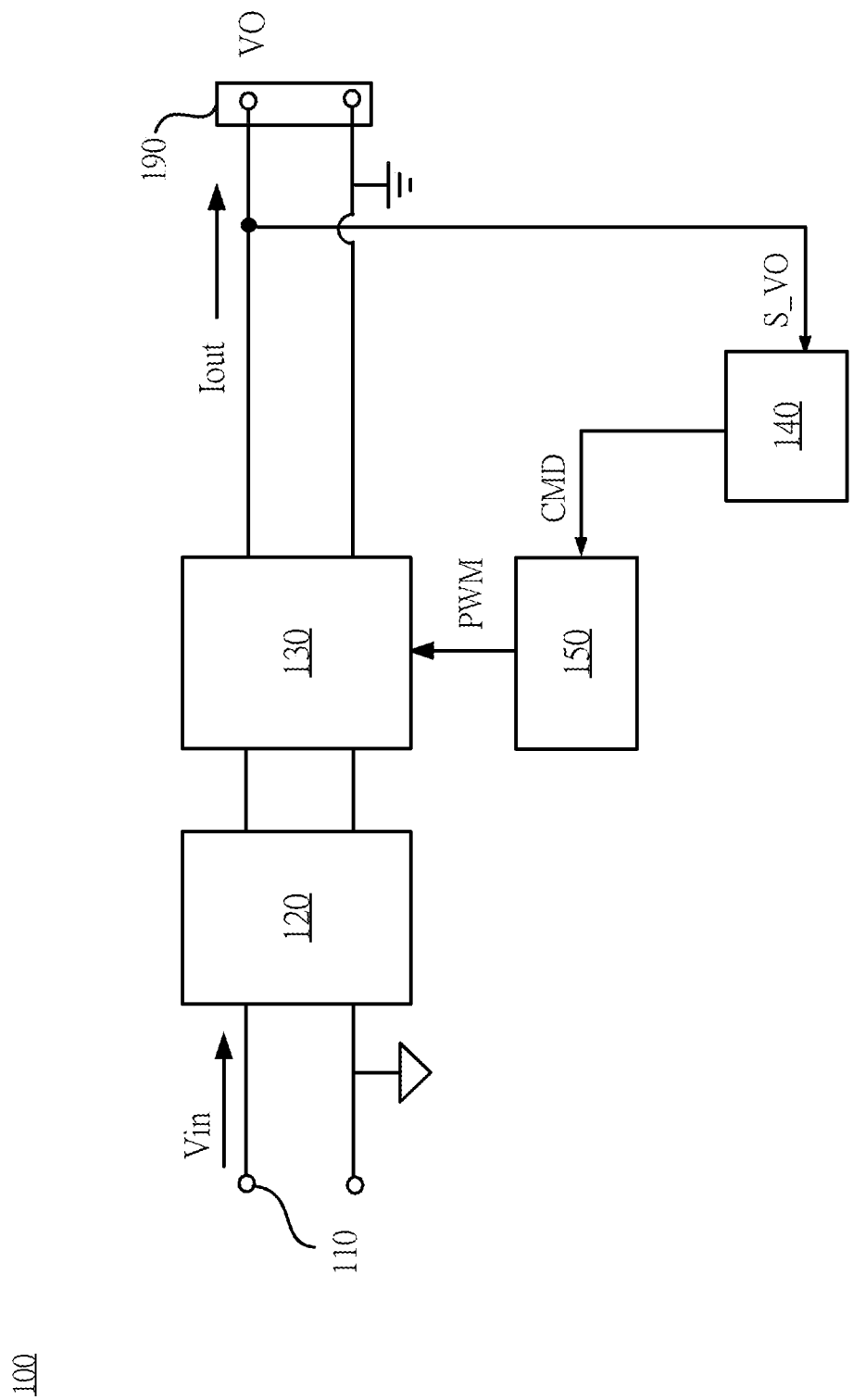
FIG. 1 is a diagram illustrating a power delivery device according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a power delivery device 100 according to some embodiments of the present disclosure. As shown in FIG. 1, in some embodiments the power delivery device includes an input terminal 110, a power factor correction circuit 120, a power conversion circuit 130, an output voltage control circuit 140, a driving circuit 150 and an output terminal 190. In some embodiments, the power delivery device 100 may be a discharge/charge system with Universal Serial Bus (USB) structure, i.e., an USB power delivery. Alternatively stated, the output terminal 190 of the power delivery device 100 may be an USB interface, for example, an USB type-C interface, but the present disclosure is not limited thereto.

In some embodiments, by the collaborative operation of the power conversion circuit 130 and the output voltage control circuit 140, the power delivery device 100 may convert an input voltage Vin received by the input terminal 110 to an output voltage VO with a corresponding voltage level according to the types or the requirements of a later-stage load connected by the output terminal 190. For example, in some embodiments, the input voltage Vin may be AC power received from the grid. The power delivery device 100 may selectively output the output voltage VO with 5V, 9V, 15V, 20V, or any other voltage levels to the load after receiving the input voltage Vin. Alternatively stated, the output voltage VO of the power delivery device 100 may be switched between multiple voltage levels so as to satisfy the requirements of different loads.

Specifically, the voltage level of the output voltage VO output by the power delivery device 100 may be controlled by the output voltage control circuit 140. In some embodiments, the output voltage control circuit 140 may receive the voltage detecting signal S_VO from the output terminal, and correspondingly output a voltage command CMD to the driving circuit 150 according to the load requirement and the voltage detecting signal S_VO. The driving circuit 150 is configured to output the driving signal PWM to the power conversion circuit 130 according to the voltage command CMD so as to control the operation of the power conversion circuit 130.

In some embodiments, the power conversion circuit 130 is configured to convert the input voltage Vin to the output voltage VO according to the driving signal PWM. Specifically, the power conversion circuit 130 includes a primary side and a secondary side. The primary side of the power conversion circuit 130 is configured to receive the input voltage Vin and the driving signal PWM. The secondary side of the power conversion circuit 130 is configured to output the output voltage VO with corresponding voltage level. It is noted that the power conversion circuit 130 may be implemented by various isolated high frequency power converter circuits, for examples, fly-back converters, forward converters, etc., but the present disclosure is not limited thereto. One skilled in the art may apply other converter circuits to output the output voltage VO with corresponding voltage level.

As shown in FIG. 1, in some embodiments, the power factor correction circuit 120 is arranged at the primary side of the power conversion circuit 130 and electrically coupled between the input terminal 110 and the power conversion circuit 130. The power factor correction circuit 120 may be configured to increase the power factor (PF) of the power delivery device 100.

Specifically, the power factor is the ratio of the real power consumed by the load device and the apparent power. When the power factor of the load device is low, the system is required to provide high current to generate the same power output, which results in the increasing power loss of the circuit system. In addition, the capacity required for the transmitting lines and the relative electrical devices increases accordingly. Therefore, in order to avoid the heavy burden of the power system due to the low power factor at the load, devices with output power above a certain value (e.g., 75 W) are required to achieve power factor correction (PFC) to comply with international regulations.

Alternatively stated, the power delivery device 100 may perform reactive power compensation with the operation of the power factor correction circuit 120 so as to increase the power factor of the power delivery device 100. However, as stated in the above paragraph, since the power delivery device 100 may adjust the output voltage and the output power according to different loads, and when the output power is lower than the regulation requirement (e.g., 75 W), there is no need to activate the power factor correction circuit 120. If the power factor correction circuit 120 remains activated at all time, the power delivery device 100 has to supply power for the operation of the power factor correction circuit 120, which increases the power loss such that the converting efficiency of the power delivery device 100 is decreased.

Therefore, in some embodiments, when the voltage level of the output voltage VO is lower than a predetermined level, the power factor correction circuit 120 is deactivated correspondingly and stops the operation. Alternatively stated, when the voltage level of the output voltage VO is lower than the predetermined level, the power delivery device 100 determines that the output power is lower than the threshold value (e.g., 75 W) to perform the power factor correction to comply the regulations, and deactivates the power factor correction circuit 120 to lower the power consumption. On the other hand, when the voltage level of the output voltage VO is larger than the predetermined level, the power delivery device 100 determines that the output power exceeds the threshold value (e.g., 75 W) to perform the power factor correction to comply the regulations. Accordingly, the power factor correction circuit 120 is activated and provides the reactive power compensation, so as to increase the power factor of the power delivery device 100.

Thus, the power delivery device 100 may selectively activate or deactivate the power factor correction function according to the voltage level of the output voltage VO when complying the regulations, so as to further reduce unnecessary power consumption by turning off the power factor correction circuit 120 when the output power is low, and increase the overall efficiency of the power delivery device 100.

Figure 2:
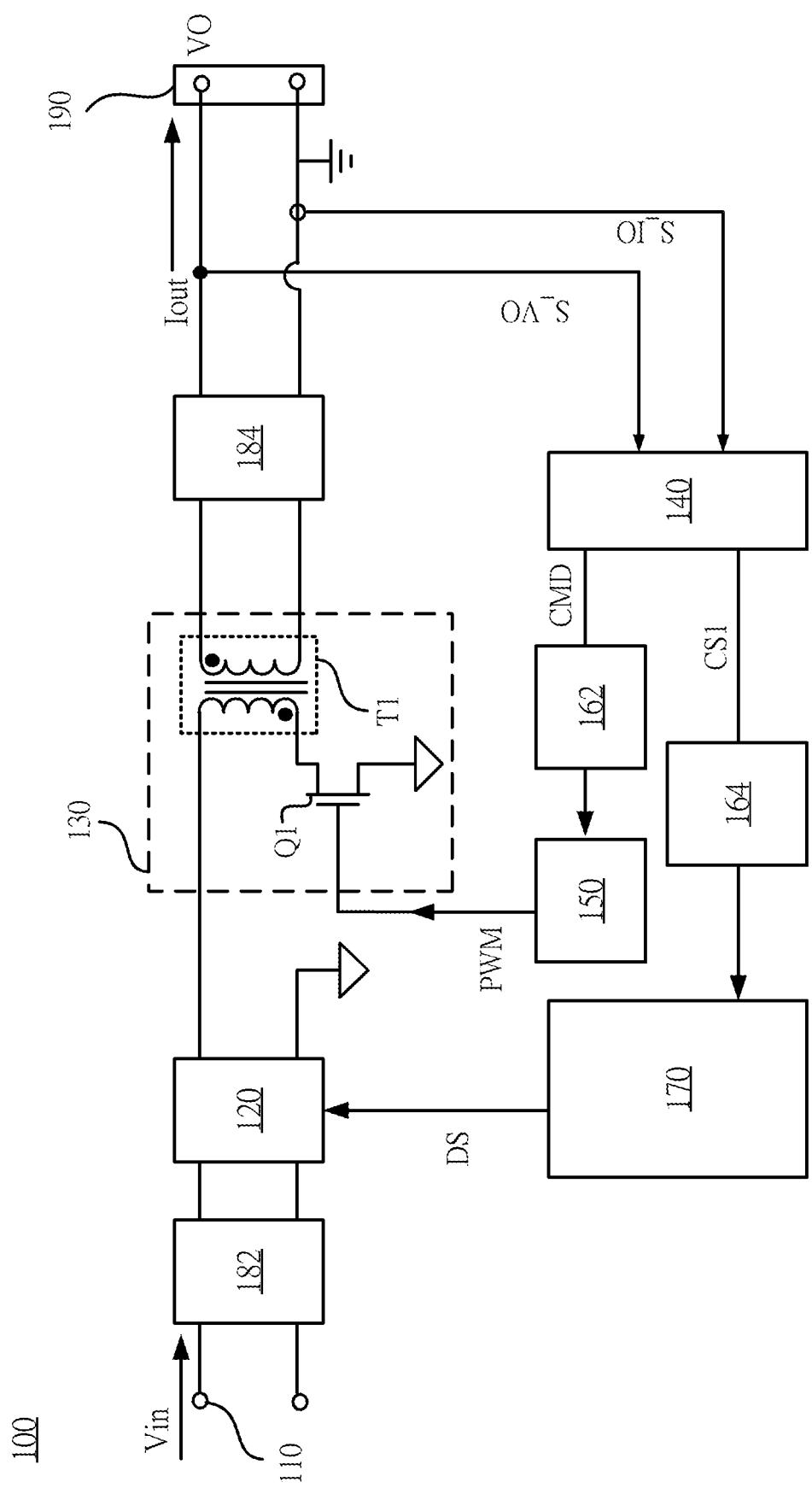
FIG. 2 is a diagram illustrating the power delivery device according to some embodiments of the present disclosure.

To further explain the specific operation of the power factor correction circuit 120 to be turned on/off according to the voltage level of the output voltage VO, reference is made to FIG. 2. FIG. 2 is a diagram illustrating the power delivery device 100 according to some embodiments of the present disclosure. In FIG. 2, like elements related to the embodiment of FIG. 1 are assigned with the same reference numerals for better understanding.

As shown in FIG. 2, in some embodiments, the power delivery device 100 further includes isolating circuits 162 and 164, a driving circuit 170, rectifying/filtering circuits 182 and 184, and the power conversion circuit 130 includes a transformer T1 and a switch Q1.

The rectifying/filtering circuit 182 is electrically coupled between the input terminal 110 and the power factor correction circuit 120. The rectifying/filtering circuit 184 is electrically coupled between a secondary side of the transformer T1 and the output terminal 190. The rectifying/filtering circuits 182 and 184 are respectively configured to rectify and filter the input voltage Vin and the output voltage VO.

For example, in some embodiments, the rectifying/filtering circuit 182 may include an over current protection element, an Electromagnetic Interference Filter (EMI Filter), and a rectifying circuit. The over current protection element (e.g., a fuse) may break the current path between the input terminal 110 and the transformer T1 when the input current exceeds a safety upper limit due to accidents such as system errors, device failures, etc., so as to avoid the circuit elements in the power delivery device 100 burn out. The Electromagnetic Interference Filter may filter out the high frequency noises in the input voltage Vin. Then, the input voltage Vin without the high frequency noises may be convert to proper voltage signal by the rectifying circuit. In some embodiments, the rectifying circuit may be implemented by various rectifier elements, such as a bridge rectifier.

As shown in FIG. 2, in some embodiments, a first terminal of the switch Q1 in the power conversion circuit 130 is electrically coupled to the primary side of the transformer T1, and a second terminal of the switch Q1 is electrically coupled to a ground terminal of the primary side. The control terminal of the switch Q1 is electrically coupled to the driving circuit 150, and configured to receive the driving signal PWM such that the switch Q1 is selectively turned on or off according to the driving signal PWM, so as to adjust the voltage signal of the primary side of the transformer T1. For example, in the embodiments that the driving signal PWM is a pulse-width modulation signal, the driving circuit 150 may control the voltage signal of the primary side of the transformer T1 by adjusting the duty cycle of the pulse-width modulation signal. Therefore, the driving circuit 150 may indirectly control the output voltage VO output from the secondary side of the transformer T1, such that the voltage level of the output voltage VO output from the transformer T1 is at 5V, 9V, 15V, 20V, or any other voltage levels corresponding to the driving signal PWM.

Alternatively stated, when the load is connected to the output terminal 190, information may be transmitted via the corresponding identification pin on the output terminal 190 to the output voltage control circuit 140 in the power delivery device 100, such that the output voltage control circuit 140 accordingly determines the types of the electronic device or the voltage level required by the electronic device, and outputs corresponding voltage command CMD. The voltage command CMD may transmit from the output voltage control circuit 140 arranged at the secondary side to the driving circuit 150 at the primary side via the isolating circuit 162. In some embodiments, the isolating circuit 162 may include an optical coupler or other isolating elements, so as to realize the electrical isolation between the primary side and the secondary side by transmitting signals through light or other ways.

Thus, the driving signal 150 at the primary side may output corresponding driving signal PWM according to the voltage command CMD, and further adjust the voltage level of the output voltage VO by adjusting the driving signal PWM to have different duty cycles to control the on and off of the switch Q1. For example, the driving circuit 150 may increase the duty cycle of the driving signal PWM to increase the voltage level of the output voltage VO, or decrease the duty cycle of the driving signal PWM to decrease the voltage level of the output voltage VO.

In some embodiments, the output voltage VO output by the transformer T1 may further be filtered and rectified by the rectifying/filtering circuit 184. Those skilled in the art can directly understand how to implement the rectifying/filtering circuit 184 using electronic elements like capacitors, inductors, etc., and further explanation is omitted herein for the sake of brevity.

Besides controlling the output voltage VO, the output voltage control circuit 140 may further detect the output voltage VO and the output current Iout of the power delivery device 100, and control the power factor correction circuit 120 to be on or off according to the voltage detecting signal S_VO and/or the current detecting signal S_IO.

For example, in some embodiments, the output voltage control circuit 140 outputs corresponding control signal CS1 according to the voltage level of the output voltage VO so as to selectively activate or deactivate the power factor correction circuit 120. As shown in FIG. 2, the isolating circuit 164 is electrically coupled between the output voltage control circuit 140 and the driving circuit 170. The driving circuit 170 is arranged at the primary side and electrically coupled to the power factor correction circuit 120.

Specifically, in some embodiments, the output voltage control circuit 140 may output the control signal CS1 to the driving circuit 170 via the isolating circuit 164. The driving circuit 170 receives the control signal CS1 from the isolating circuit 164, and correspondingly outputs the driving signal DS to the power factor correction circuit 120. Thus, the power factor correction circuit 120 may be turned on or turned off according to the driving signal DS.

Figure 3:
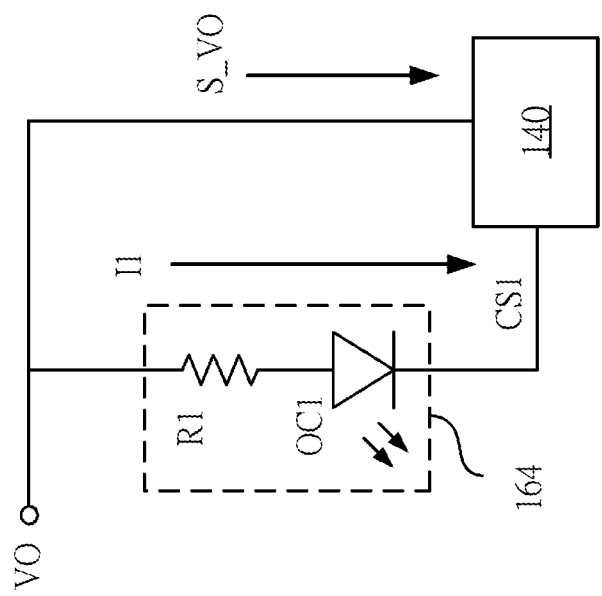
FIG. 3 is a diagram illustrating the collaborative operation of the output voltage control circuit and the isolating circuit according to some embodiments of the present disclosure.
Figure 4:
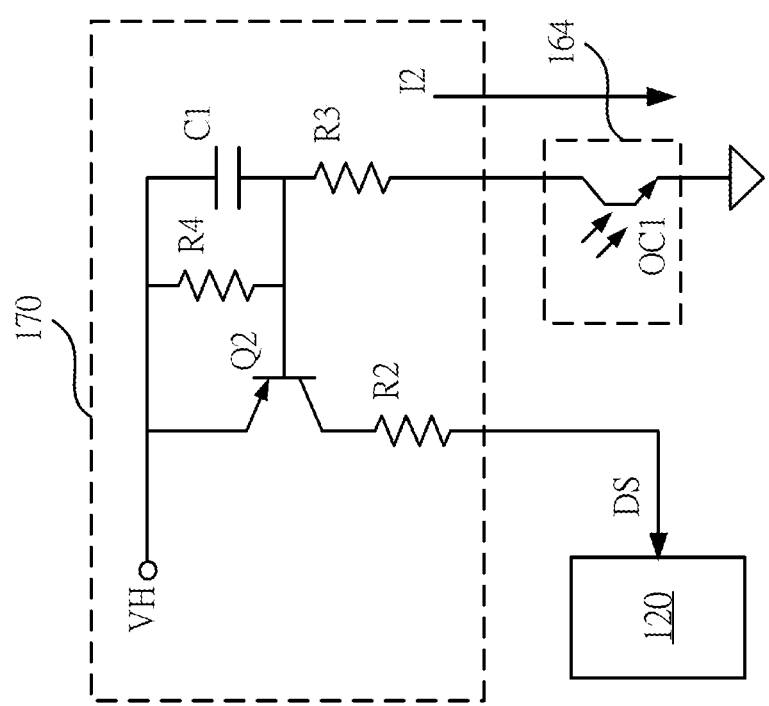
FIG. 4 is a diagram illustrating the collaborative operation of the isolating circuit and the driving circuit according to some embodiments of the present disclosure.

In order to further explain the detailed operation of the control signal CS1 and the driving signal DS, reference is made to FIG. 3 and FIG. 4. FIG. 3 is a diagram illustrating the collaborative operation of the output voltage control circuit 140 and the isolating circuit 164 according to some embodiments of the present disclosure. FIG. 4 is a diagram illustrating the collaborative operation of the isolating circuit 164 and the driving circuit 170 according to some embodiments of the present disclosure. In FIG. 3 and FIG. 4, like elements related to the embodiment of FIG. 2 are assigned with the same reference numerals for better understanding.

As shown in FIG. 3, in some embodiments, the isolating circuit 164 includes an optical coupler OC1 and a resistor R1. A first input terminal of the optical coupler OC1 is electrically coupled to the output voltage control circuit 140. A first terminal of the resistor R1 is configured to receive the output voltage VO. A second terminal of the resistor R1 is electrically coupled to a second input terminal of the optical coupler OC1.

When the output voltage control circuit 140 determines the voltage level of the output voltage VO is smaller than a predetermined level (e.g., 20V) according to the voltage detecting signal S_VO, the output voltage control circuit 140 outputs the control signal CS1 with a first level (e.g., low level). Thus, since a voltage difference exists between two terminals of the input side of the isolating circuit 164, a driving current I1 occurs and flows through the resistor R1 and drives the light emitting diode in the optical coupler OC1.

Alternatively stated, when the voltage level of the output voltage VO is smaller than the predetermined level (e.g., 20V), the output voltage control circuit 140 outputs a first disable signal. When the first input terminal of the optical coupler OC1 receives the first disable signal, the driving current I1 is generated to drive the light emitting diode, so as to transmit the control signal CS1 to the primary side.

Reference is made to FIG. 4. As shown in FIG. 4, in some embodiments, the driving circuit 170 includes a switch Q2, resistor R2, R3 and R4, and a capacitor C1. As illustrated in the figure, in some embodiments, the switch Q2 may be implemented by a Bipolar Junction Transistor (BJT). In various embodiments, those skilled in the art may select npn type or pnp type BJT elements, and the driving circuit 170 illustrated in FIG. 4 is merely for exemplary use and not meant to limit the present disclosure.

The resistor R2 is electrically coupled between the switch Q2 and the power factor correction circuit 120. The resistor R3 is electrically coupled between the switch Q2 and the isolation circuit 164. The resistor R4 and the capacitor C1 are coupled in parallel to each other and electrically coupled between the first terminal and the control terminal of the switch Q2.

The first terminal of the switch Q2 is configured to receive the disable level VH (e.g., high level). The second terminal of the switch Q2 is electrically coupled to the power factor correction circuit 120 via the resistor R2. The control terminal of the switch Q2 is electrically coupled to the isolating circuit 164 via the resistor R3.

When the input side of the optical coupler OC1 in the isolating circuit 164 receive the first disable signal such that the light emitting diode is driven correspondingly, the optical detector at the output side of the optical coupler OC1 is turned on synchronously and thus a corresponding driving current I2 is generated to transmit the first disable signal to the control terminal of the switch Q2. Therefore, the disable level VH (e.g., high level) and the power factor correction circuit 120 are coupled by the turned-on switch Q2, such that the driving circuit 170 outputs the second disable signal from the second terminal of the switch Q2 to the power factor correction circuit 120 via the resistor R2 to turn off the power factor correction circuit 120.

Alternatively stated, with the operation of using the isolation circuit 164 to transmit the control signal CS1 from the secondary side to the primary side, the control terminal of the switch Q2 may correspondingly receive the control signal CS1, such that the switch Q2 is turned on or turned off selectively according to the control signal CS1. Accordingly, the second terminal of the switch Q2 may selectively output the driving signal DS with different levels to the power factor correction circuit 120. When the switch Q2 is turned on such that the driving circuit 170 outputs the driving signal DS with a first level (e.g., high level), the power factor correction circuit 120 is turned off correspondingly. On the other hand, when the switch Q2 is turned off such that the driving circuit 170 outputs the driving signal DS with a second level (e.g., low level), the power factor correction circuit 120 is activated correspondingly, and performs reactive power compensation according to the phase of the voltage and the current received from the grid so as to increase the power factor.

Figure 5:
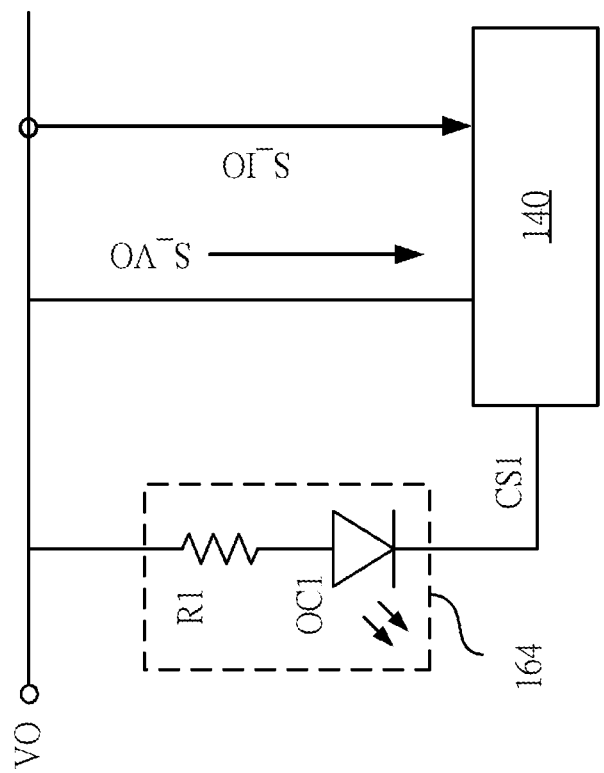
FIG. 5 is a diagram illustrating the collaborative operation of the output voltage control circuit and the isolating circuit according to some other embodiments of the present disclosure.

In addition, in some other embodiments, the output voltage control circuit 140 may further receive the current detecting signal S_IO as illustrated in FIG. 2, in order to determine whether the load is in light load state or in heavy load state in accompany with the magnitude of the output current Iout, so as to control the activation and the deactivation of the power factor correction circuit 120. For example, the activation and the deactivation of the power factor correction circuit 120 may be postponed, and to be controlled when the system is operated in the heavy load state. During the light load state, the output voltage control circuit 140 does not have to control the activation/deactivation of the power factor correction circuit 120 with the control signal CS1. Reference is made to FIG. 5. FIG. 5 is a diagram illustrating the collaborative operation of the output voltage control circuit 140 and the isolating circuit 164 according to some other embodiments of the present disclosure. In FIG. 5, like elements related to the embodiment of FIG. 2 and FIG. 3 are assigned with the same reference numerals for better understanding.

Compared to the embodiment shown in FIG. 3, in the embodiment shown in FIG. 5, the output voltage control circuit 140 further receives the current detecting signal S_IO to detect the output current Iout of the power delivery device 100. When the output current Iout is larger than the predetermined current value, as stated in the above paragraph, the output voltage control circuit 140 outputs corresponding control signal CS1 according to the voltage level of the output voltage VO to selectively turn on or turn off the power factor correction circuit 120. The specific operation of the output voltage control circuit 140 outputting the control signal CS1 is described in details in above paragraphs, and thus is omitted herein for the sake of brevity.

On the other hand, when the output current Iout is smaller than the predetermined current value, the output voltage control circuit 140 does not turn off the power factor correction circuit 120 with the control signal CS1.

Specifically, when the output current Iout is smaller than the predetermined current value, the power delivery device is operated in the light load or a no load state, and the condition of performing the power factor correction is not satisfied even if the power factor correction circuit 120 remains normal operation. Therefore, no extra power consumption is caused when the power factor correction circuit 120 remains normal operation. On the other hand, if the power factor correction circuit 120 is forced to be off by the operation of the isolating circuit 164 and the driving circuit 170, addition power loss is caused in the power delivery device 100 due to the driving current I1 flowing through the isolating circuit 164 and the driving current I2 flowing through the switch Q2, and the overall conversion efficiency is decreased. In addition, since the output power is low when operated in the light load or no load state, the ratio between the loss due to the driving current I1, I2 and the overall input power of the power delivery device 100 is significant.

Therefore, in some embodiments, the output voltage control circuit 140 may avoid the decrease of the conversion efficiency resulted from deactivating the power factor correction circuit 120 with the control signal CS1 in the light load state, by detecting the magnitude of the output current Iout and controlling the activation/deactivation of the power factor correction circuit 120 with the control signal CS1 when the output current Iout is larger than the predetermined current value.

In addition, in some embodiments, the output voltage control circuit 140 may further configure a duty cycle to detect the output current Iout. For example, the output voltage control circuit 140 may detect the output current Iout in a detecting period, and stop detecting the output current Iout in a sleeping period. Thus, during the sleeping period, the output voltage control circuit 140 may be operated in an energy saving sleeping mode to further reduce the power consumption resulted from the detection of the output current Iout. For example, in some embodiments, the duty cycle of the detection of the output current Iout may be 25%, and each cycle includes the detecting period of about 1 second, and the sleeping period of about 3 seconds. Accordingly, the output voltage control circuit 140 executes current detection in only about 25% time in the cycle, and operates in energy saving sleeping mode in about 75% time, so as to improve the energy saving.

It is noted that, those skilled in the art may adjust and modify the duty cycle of detecting output current Iout, the length of the detecting period and/or the sleeping period based on actual needs. Alternatively stated, the duty cycle and the length of the detecting period and the sleeping period disclosed in the above embodiments are merely for exemplary purposes and not meant to limit the present disclosure.

In addition, the elements in the above embodiments may be implemented by various digital or analog circuits, and may also be implemented by different integrated circuit chips. Each element may also be integrated in a single digital control chip. Each control circuit may also be realized by various processors or other integrated circuit chips. The circuits illustrated in the above figures are merely exemplary and are not meant to be limitations of the present disclosure.

Figure 6:
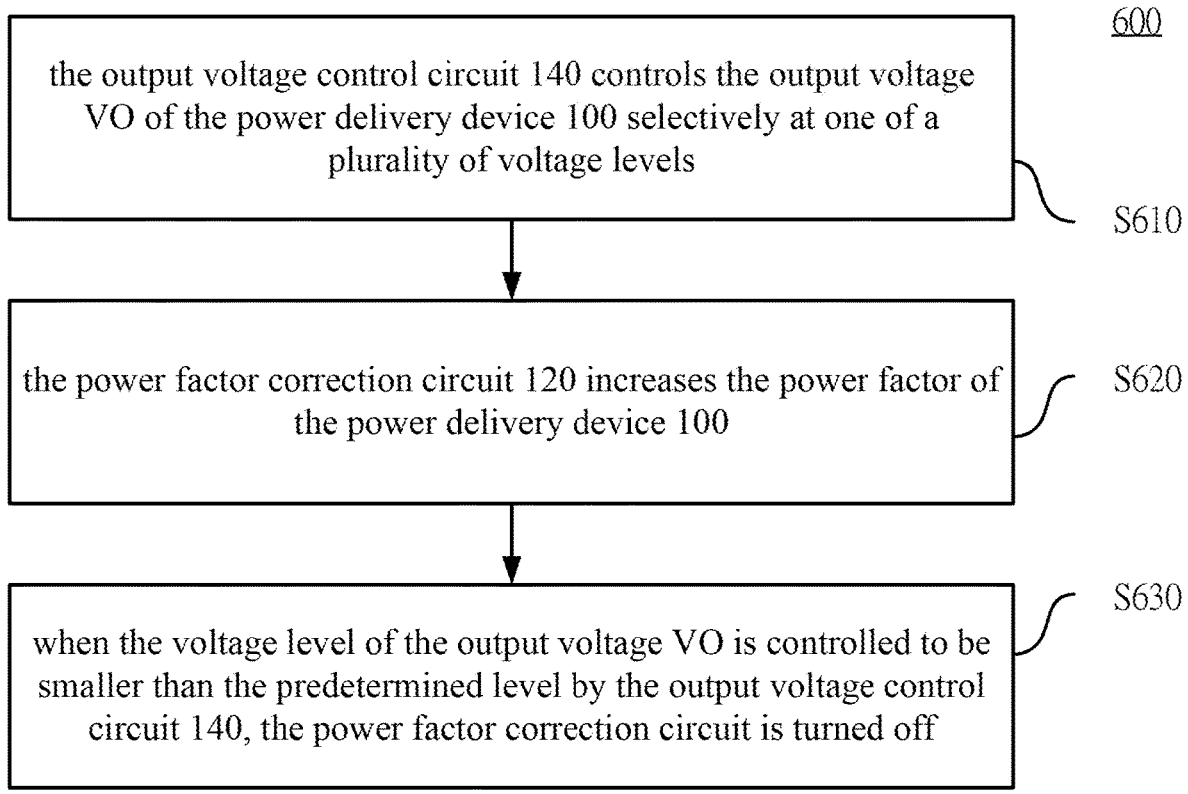
FIG. 6 is a flowchart illustrating a control method according to some embodiments of the present disclosure.

Reference is made to FIG. 6. FIG. 6 is a flowchart illustrating a control method 600 according to some embodiments of the present disclosure. For better understanding of the present disclosure, the control method 600 is discussed in relation to the power delivery device 100 in the embodiments shown in FIGS. 1-5, but is not limited thereto. It will be apparent to those skilled in the art that various modifications and variations can be made without departing from the scope or spirit of the disclosure. As shown in FIG. 6, the control method 600 includes operations S610, S620, and S630.

First, in operation S610, the output voltage control circuit 140 controls the output voltage VO of the power delivery device 100 selectively at one of a plurality of voltage levels.

Next, in operation S620, the power factor correction circuit 120 increases the power factor of the power delivery device 100. For example, in some embodiments, the power factor correction circuit 120 performs corresponding reactive power compensation according to the phase of the input voltage and the input current to increase the power factor of the power delivery device 100.

Next, in operation S630, when the voltage level of the output voltage VO is controlled to be smaller than the predetermined level by the output voltage control circuit 140, the power factor correction circuit is turned off.

Figure 7:
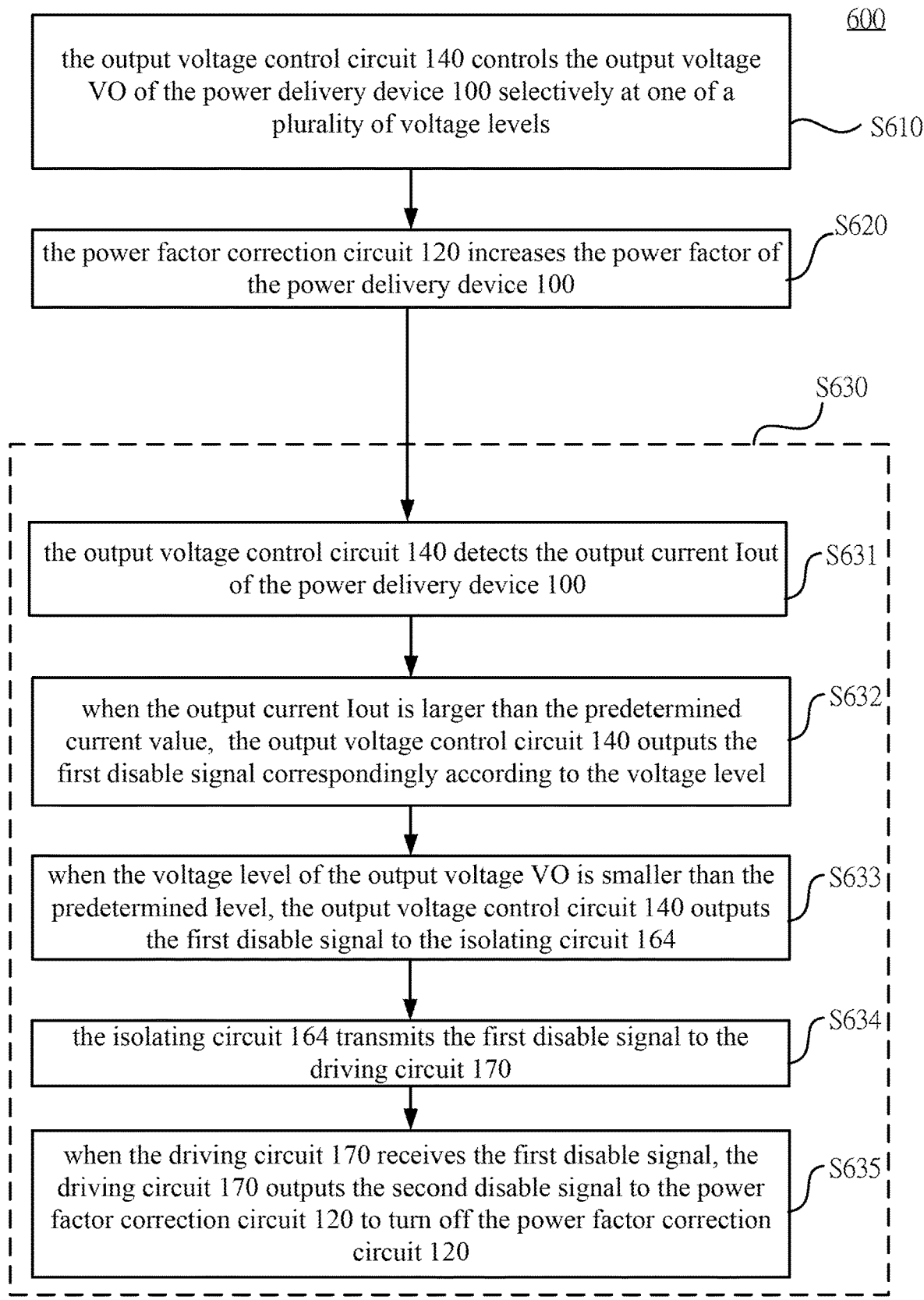
FIG. 7 is a flowchart illustrating the control method according to some embodiments of the present disclosure.

To further explain the operations of turning off the power factor correction circuit 120, reference is made to FIG. 7 together. FIG. 7 is a flowchart illustrating the control method 600 according to some embodiments of the present disclosure. Similarly, the control method 600 is discussed in relation to the power delivery device 100 in the embodiments shown in FIGS. 1-5, but is not limited thereto. It will be apparent to those skilled in the art that various modifications and variations can be made without departing from the scope or spirit of the disclosure. As shown in FIG. 7, in some embodiments, the operation S630 in the control method 600 further includes operations S633, S634, and S635.

First, in operation S633, when the voltage level of the output voltage VO is smaller than the predetermined level, the output voltage control circuit 140 outputs the first disable signal to the isolating circuit 164. Next, in operation S634, the isolating circuit 164 transmits the first disable signal to the driving circuit 170. Next, in operation S635, when the driving circuit 170 receives the first disable signal, the driving circuit 170 outputs the second disable signal to the power factor correction circuit 120 to turn off the power factor correction circuit 120.

In addition, in some embodiments, in the operation S630, operation S631 and operation S632 are further executed before the operation S633 is executed. In operation S631, the output voltage control circuit 140 detects the output current Iout of the power delivery device 100. In operation S632, when the output current Iout is larger than the predetermined current value, the operation S633 is executed, and the output voltage control circuit 140 outputs the first disable signal correspondingly according to the voltage level. It is noted that, in some embodiments, the output voltage control circuit 140 executes operation S631 in a detecting period, and the output voltage control circuit 140 stops executing operation S631 in a sleeping period different from the detecting period.

Thus, the control method 600 may be used to control the power factor correction circuit 120 according to the operating state of the power delivery device 100, so as to increase the overall conversion efficiency of the power delivery device 100 in comply with the regulations. Those skilled in the art can immediately understand how to perform the operations and functions of the control method 600 based on the power delivery device 100 in the various embodiments described above, and thus further explanation is omitted herein for the sake of brevity.

While disclosed methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Alternatively stated, the order of the operations disclosed in the present disclosure may be changed, or the operations may even be executed simultaneously or partially simultaneously as appropriate, in accordance with the spirit and scope of various embodiments of the present disclosure.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power delivery device, comprising:
a power factor correction circuit configured to increase a power factor of the power delivery device; and
an output voltage control circuit configured to control an output voltage of the power delivery device, and detect an output current of the power delivery device;
wherein the power factor correction circuit is deactivated by the output voltage control circuit if the output voltage is lower than a predetermined level and the output current is larger than a predetermined current value,
wherein the power factor correction circuit is turned on by the output voltage control circuit if the output voltage is lower than the predetermined level and the output current is smaller than the predetermined current value and greater than zero.

2. The power delivery device of claim 1, further comprising:
a power conversion circuit comprising a primary side and a secondary side, and configured to receive an input voltage and convert the input voltage to the output voltage.

3. The power delivery device of claim 2, wherein the power factor correction circuit is electrically coupled to the primary side, and the output voltage control circuit is electrically coupled to the secondary side.

4. The power delivery device of claim 1, wherein when the output current is larger than the predetermined current value, the output voltage control circuit outputs a corresponding control signal according to the output voltage, to turn on or turn off the power factor correction circuit selectively.

5. The power delivery device of claim 4, wherein the output voltage control circuit is further configured to detect the output current in a detecting period, and stop detecting the output current in a sleeping period.

6. A power delivery device, comprising:
an output voltage control circuit, configured to control an output voltage of the power delivery device, to selectively switch the output voltage at one of a plurality of voltage levels, and configured to detect an output current of the power delivery device; and
a power factor correction circuit, configured to increase a power factor of the power delivery device;
wherein the power factor correction circuit is deactivated by the output voltage control circuit if the output voltage is lower than a predetermined level and the output current is larger than a predetermined current value,
wherein the power factor correction circuit is turned on by the output voltage control circuit if the output voltage is lower than the predetermined level and the output current is smaller than the predetermined current value and greater than zero.

7. The power delivery device of claim 6, wherein when a voltage level of the output voltage is smaller than the predetermined level and the output current is larger than the predetermined current value, the output voltage control circuit outputs a first disable signal to turn off the power factor correction circuit.

8. The power delivery device of claim 7, further comprising:
an isolating circuit, electrically coupled to the output voltage control circuit; and
a driving circuit, electrically coupled to the power factor correction circuit and the isolating circuit, and the driving circuit is configured to receive the first disable signal from the output voltage control circuit via the isolating circuit, and output a second disable signal correspondingly to the power factor correction circuit to turn off the power factor correction circuit.

9. The power delivery device of claim 8, wherein the isolating circuit comprises an optical coupler, and a first input terminal of the optical coupler is configured to receive the first disable signal, and an output terminal of the optical coupler is electrically coupled to the driving circuit.

10. The power delivery device of claim 9, wherein the isolating circuit further comprises a first resistor, and a first terminal of the first resistor is configured to receive the output voltage, and a second terminal of the first resistor is electrically coupled to a second input terminal of the optical coupler.

11. The power delivery device of claim 8, wherein the driving circuit comprises a switching unit, and a first terminal of the switching unit is configured to receive a disable level, a second terminal of the switching unit is electrically coupled to the power factor correction circuit, and a control terminal of the switching unit is electrically coupled to the isolating circuit.

12. The power delivery device of claim 11, wherein when the control terminal of the switching unit receives the first disable signal, the switching unit is turned on correspondingly such that the second terminal of the switching unit outputs the second disable signal to the power factor correction circuit.

13. The power delivery device of claim 11, wherein the driving circuit further comprises a second resistor and a third resistor, and the second terminal of the switching unit is electrically coupled to the power factor correction circuit via the second resistor, and the control terminal of the switching unit is electrically coupled to the isolating circuit via the third resistor.

14. The power delivery device of claim 7, wherein when the output current is larger than the predetermined current value, the output voltage control circuit outputs the first disable signal correspondingly according to the voltage level of the output voltage to turn off the power factor correction circuit.

15. A control method, comprising:
controlling, by an output voltage control circuit, an output voltage of a power delivery device selectively at one of a plurality of voltage levels;
detecting, by the output voltage control circuit, an output current of the power delivery device;
increasing, by a power factor correction circuit, a power factor of the power delivery device;
turning off the power factor correction circuit by the output voltage control circuit if the output voltage is lower than a predetermined level and the output current is larger than a predetermined current value; and
turning on the power factor correction circuit by the output voltage control circuit if the output voltage is lower than the predetermined level and the output current is smaller than the predetermined current value and greater than zero.

16. The control method of claim 15, wherein turning off the power factor correction circuit further comprises:
outputting, by the output voltage control circuit, a first disable signal correspondingly when the output current is larger than the predetermined current value.

* * * * *